Feb. 23, 1960     E. A. ATMORE     2,925,703
BRUSH MASTICATING MACHINE

Filed March 25, 1958     4 Sheets-Sheet 2

INVENTOR.
EDWARD A. ATMORE
BY
ATTORNEYS

INVENTOR.
EDWARD A. ATMORE
BY
ATTORNEYS

INVENTOR.
EDWARD A. ATMORE
BY
Lyon & Lyon
ATTORNEYS

United States Patent Office 2,925,703
Patented Feb. 23, 1960

2,925,703

BRUSH MASTICATING MACHINE

Edward A. Atmore, Santa Paula, Calif.

Application March 25, 1958, Serial No. 723,718

10 Claims. (Cl. 56—502)

My invention relates to brush masticating machines and is a continuation-in-part of my copending application, Serial No. 412,732, filed February 26, 1954, now abandoned.

Included in the objects of this invention are:

First, to provide a brush masticating machine adapted to be moved along a windrow of brush cuttings or tree trimmings, pick up such cuttings or trimmings from the ground, and thoroughly disintegrate them into small fragments which may be returned to the ground to form a mulch or may be conveyed away.

Second, to provide a brush masticating machine which is particularly adapted to handle a tangled mass of cuttings and tree trimmings, the twigs and branches of which are disoriented, with a minimum of manual handling of the cuttings and trimmings.

Third, to provide a brush masticating machine wherein a pair of bladed deflector drums gathers the trimmings lying at the sides of the windrow and crushes them into a relatively narrow, vertically disposed mass, and wherein a second pair of rotors crowd the mass vertically for delivery to the mouth of a hog or masticator, the drums and rotors being so arranged that stray branches are caught and deflected so as to enter the masticator for disintegration.

With the above and other objects in view, as may appear hereinafter, reference is directed to the accompanying drawings in which.

Figure 1:
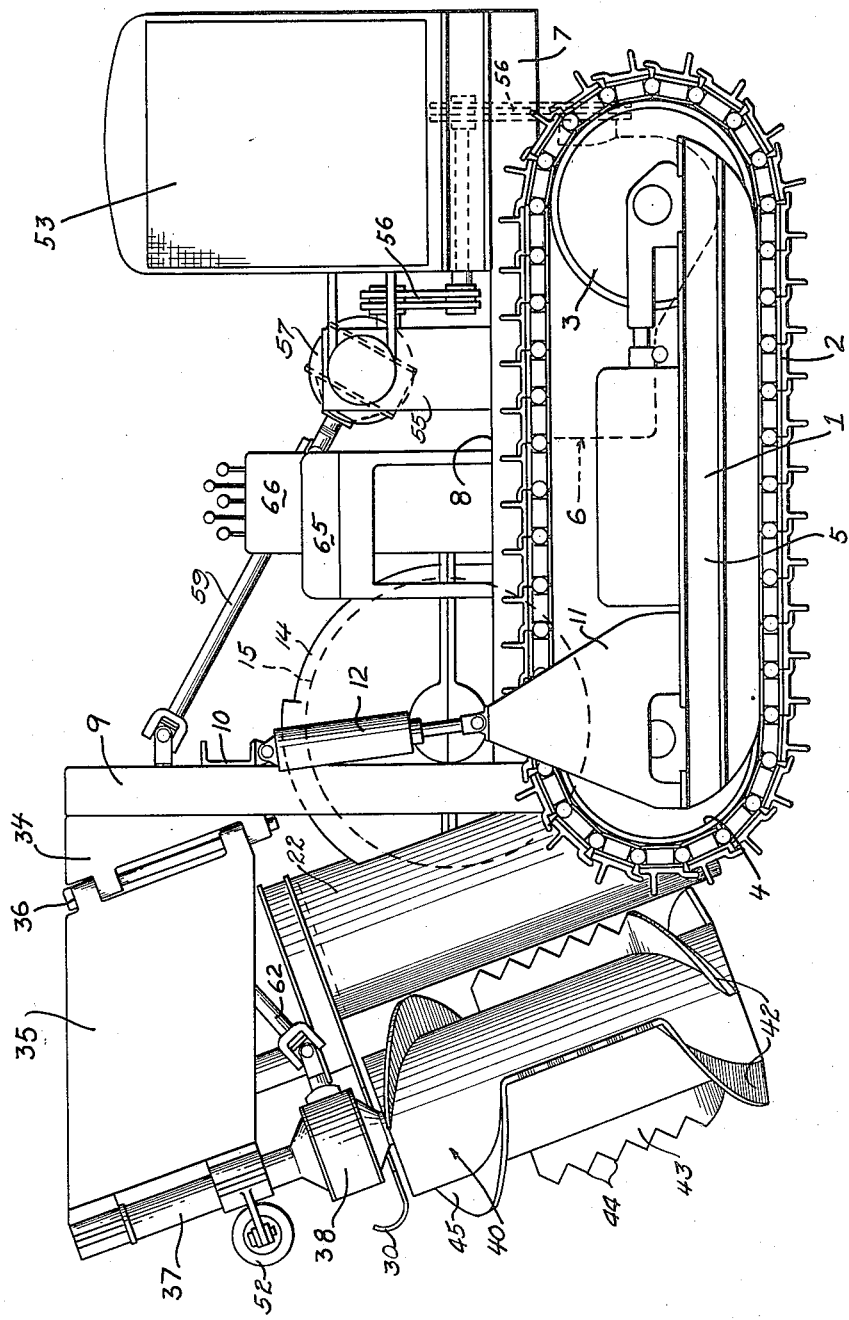
Figure 1 is a side view of the machine.
Figure 2:
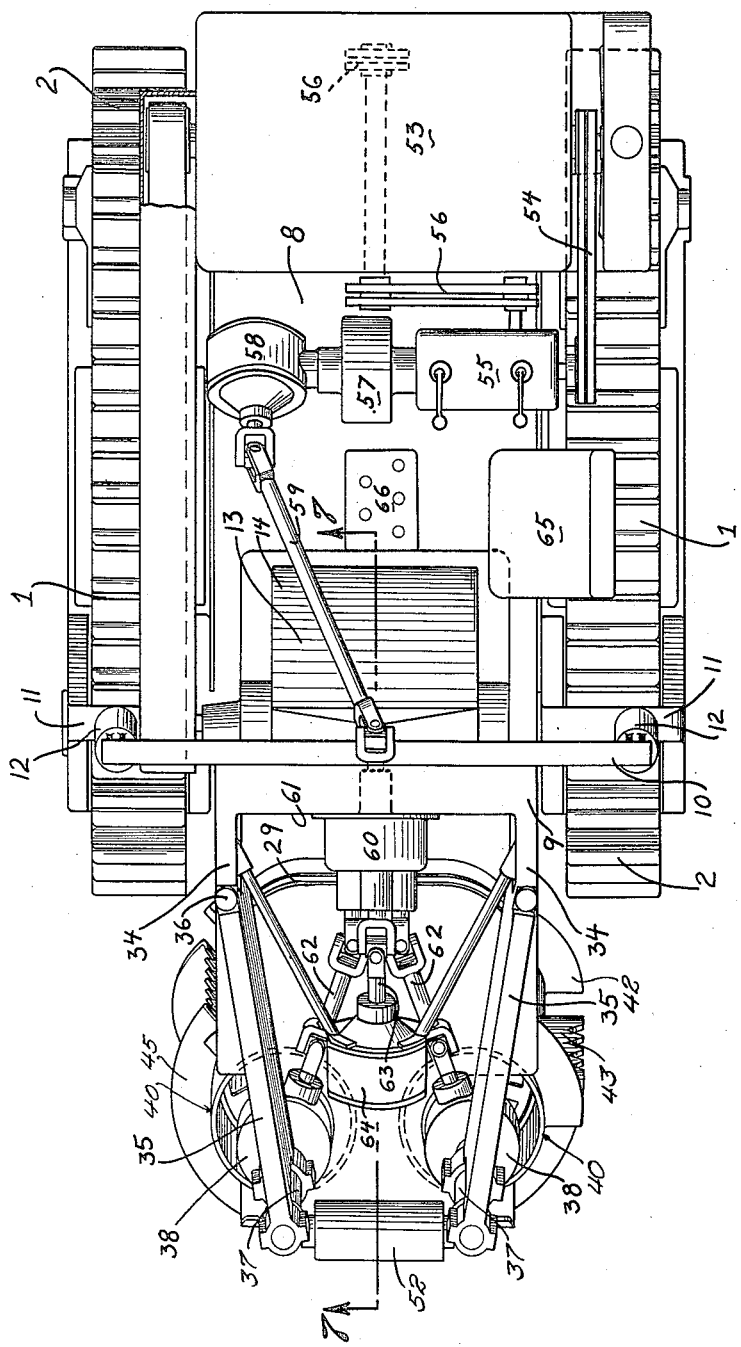
Figure 2 is a top view thereof.
Figure 3:
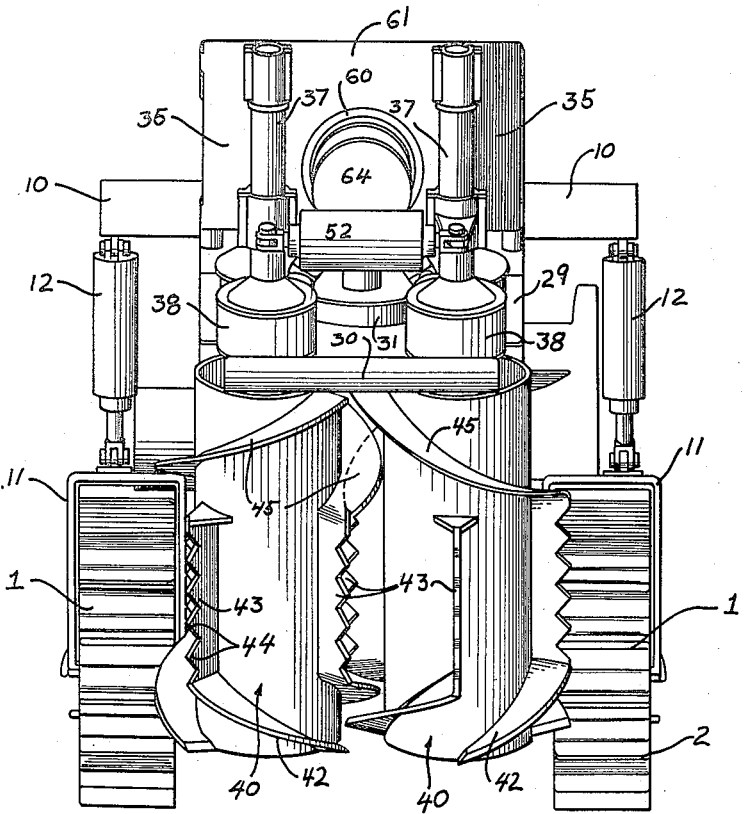
Figure 3 is a front view thereof.

The brush masticating machine is mounted on a pair of crawler tractor units 1, each of which includes a track 2, a rear drive wheel 3, a forward wheel 4, and framework 5 on which the wheels are mounted. The tractor units are, per se, conventional.

Between the tractor units 5 is a tractor chassis 6 which is conventional except that the tractor motor is removed. The chassis thus contains the conventional drive mechanism which connects to the tractor units 1. The chassis 6 is capable of pivotal movement about the axis of the rear drive wheels 3.

Supported on the chassis 6 is a pair of longitudinally extending deck beams 7 located adjacent to and inwardly from the tractor units 1. The deck beams support a deck 8. The deck beams also support a pair of vertical posts 9 which are connected by a cross beam 10, the ends of which extend over the tractor units 1.

Each tractor unit 1 is provided adjacent its forward wheel 4 with a yoke 11 which is connected to the cross beam 10 through a hydraulic cylinder unit 12 arranged to extend and retract so as to pivot the chassis 6 and deck 8 a limited amount about the axis of the rear wheels 3, for the purpose of raising and lowering the vertical post 9 and forward end of the deck 8. Set into the deck 8 at its forward end is a hog or masticating unit 13.

The masticating unit 13 includes a housing structure 14 in which is mounted a rotor 15 carried on a shaft 16. The rotor is formed of a pair of frusto-conical members joined at their smaller ends. Set into the conical surfaces of the rotor 15 are blades 17. Slots 18 are provided adjacent the blades for discharge of masticated chips. The larger ends of the frusto-conical portions of the rotor 15 are open and project below the housing so that chips may discharge onto the ground below. The upper portion of the housing structure 14 includes an anvil mounting frame 19 in which are mounted anvils 20 which coact with the blades 17 of the rotor 15.

Mounted forwardly of the masticating unit 13 is a pair of feed rotors 21. The axes of the rotors 21 are located adjacent the larger ends of the masticating rotor 15 and their axes are tilted so as to project downwardly and rearwardly in front of the masticating unit 13. The feed rotors 21 are partially enclosed in semicylindrical housings 22 which join to the housing structure 14.

Located between the feed rotors 21 and joined to the housings 22 is a lower deflector 23 which projects into the space between the frusto-conical portions of the rotor 15 but clears the blades 17. The lower deflector forms a partition which divides the masticating unit 13 so as to form with the anvil mounting frame 19 a mouth 24, and also forms with the rear side of the housing structure 14 a discharge opening 25. The upper ends of the housings 22 are joined by an upper deflector 26 which slopes downwardly and rearwardly and joins to the anvil mounting frame 19.

Figure 6:
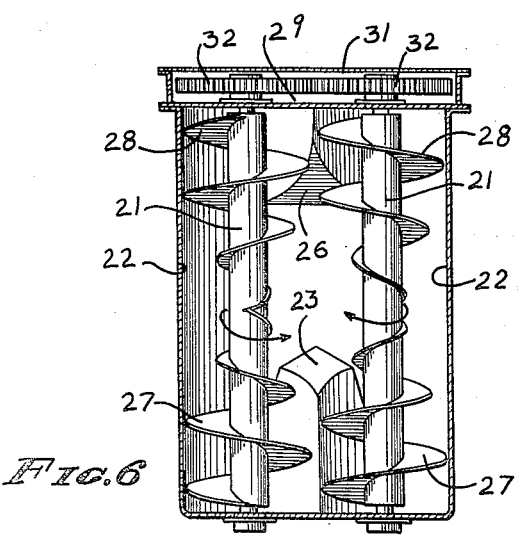
Figure 6 is a sectional view through 6—6 of Figure 7 showing the feed rotors.
Figure 7:
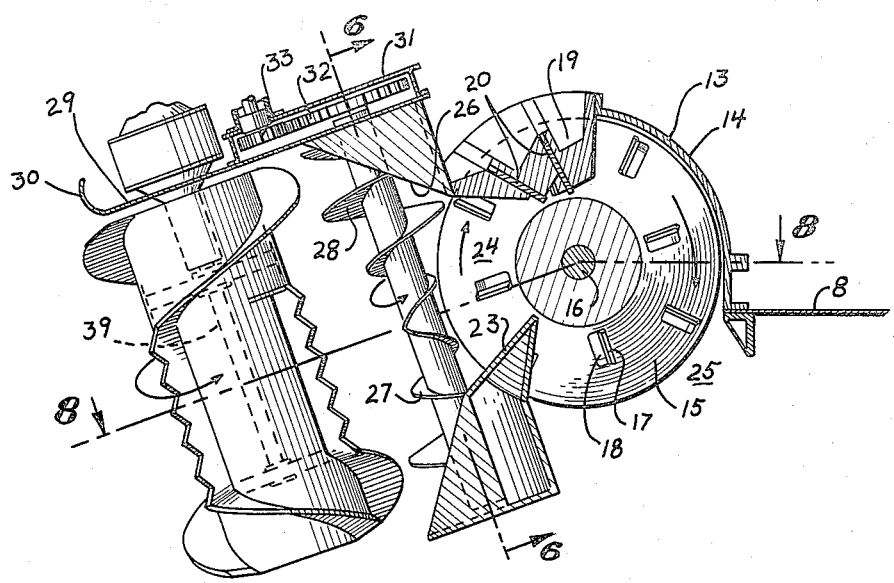
Figure 7 is a fragmentary, longitudinal, sectional view through 7—7 of Figure 2.
Figure 8:
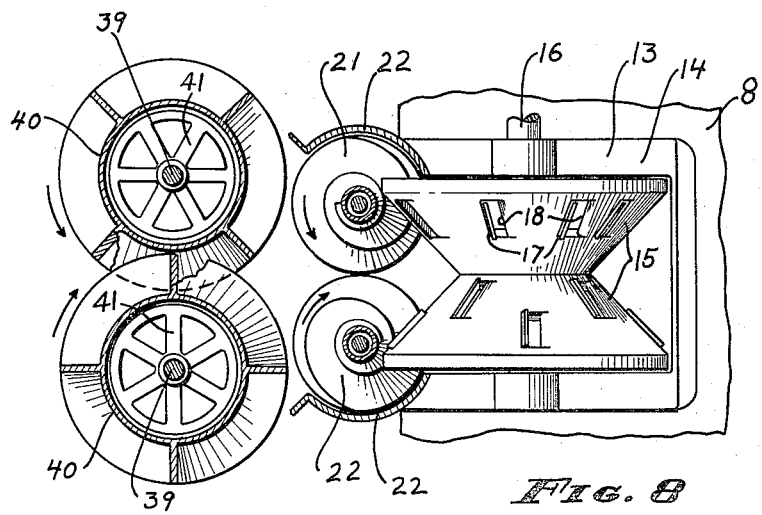
Figure 8 is a fragmentary sectional view through 8—8 of Figure 7.

Each feed rotor 21 is provided with a lower helical lifting blade 27 and an upper helical depressing blade 28. The blades 27 and 28 are of opposite pitch. The feed rotors are set close to the masticating rotor 15. The blades 27 and 28 diminish in width as they approach each other at the central portions of the rotors, so as to conform to the masticating rotor as shown in Figures 6, 7 and 8.

Covering the housings 22 and extending downwardly and forwardly therefrom is a guard plate 29 having an upturned forward edge 30. Mounted on the guard plate 29 is a gear housing 31 having intermeshing gears 32 connected to the shafts of the feed rotors 21. A drive gear 33 meshes with one of the rotor gears 32 and is provided with an upwardly directed shaft connected to a drive means which will be described hereinafter.

The vertical posts 9 project above the housings 22 and are provided with brackets 34 at their upper ends. The brackets 34 are joined to pivot frames 35 by hinge means 36 which define axes directed downwardly and rearwardly parallel to the axes of the feed rotors 21. The pivot frames 35 extend forwardly, and each pivot frame supports a tubular housing 37 along an axis parallel with the hinge means 36 and the feed rotors 21. The lower ends of the tubular housings 37 are joined to gear housings 38.

Contained within each tubular housing 37 and gear housing 38 is a shaft 39 which projects downward within a gathering drum 40. Each gathering drum is provided with an upper and lower spider frame 41 which is fixed to the corresponding shaft 39. The gathering drums 40 are relatively cylindrical and their axes are parallel to the axes of the feed rotors 21, that is, the axes of the gathering drums tilt rearwardly and downwardly from the vertical.

Each gathering drum 40 is provided with a set of lower helical vanes or blades 42. In the drawings, four such blades are shown. Each vane or blade is provided with a sharpened lower edge flush with the lower edge of the gathering drum and curves upwardly therefrom through a 90° arc. The upper ends of the lower vanes 42 are joined to axially directed blades 43 which are preferably provided with coarse teeth 44. The upper portion of each gathering drum 40 is provided with upper helical vanes or blades 45 of opposite pitch to the lower vanes 42. Two such upper vanes are illustrated and each has an arcuate extent of approximately 180°.

The gathering drums 40 are intended to rotate in opposite directions so that their confronting sides move rearwardly toward the feed rotors 21. The blades of the two drums are provided with opposite pitch and one drum is circumferentially offset with respect to the other so that the blades or vanes intermesh. By reason of the direction of rotation of the drums 40, the blades or vanes, as they pass the forward sides of the drums, move toward each other.

The lower extremities of the lower helical vanes 42 may be fixed and merely sharpened. However, it is prefered to provide retractable fingers 46 which project forwardly of the radially outer margins of the leading edges of the blades.

Figure 4:
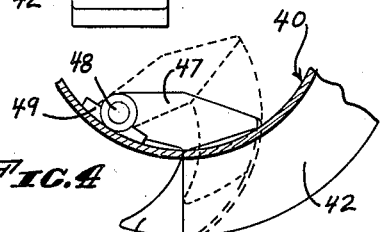
Figure 4 is a fragmentary, sectional view through 4—4 of Figure 5, showing one of the retractable fingers for the gathering blades.
Figure 5:
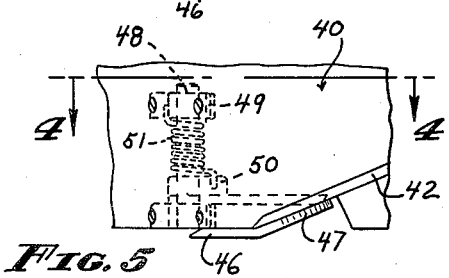
Figure 5 is a fragmentary, side view of the lower portions of one of the gathering drums and a retractable finger.

The fingers 46 are mounted on arms 47 which extend under the drums 40 and are secured to shafts 48 extending upwardly within the drums parallel to the axis of the drums. The shafts 48 are supported in suitable bearings 49 and 50 and are provided with torsion springs 51 so as to urge the fingers toward the extended position shown in solid lines in Figures 4 and 5. If the fingers encounter excessive resistance, they are capable of retracting as indicated by dotted lines in Figure 4.

The pair of gathering drums 40 are urged toward each other by a pneumatic spring 52 extending between the pivot frames 35. Coil springs may be used; however, a pneumatic spring may be subject to control by the operator so as to increase or decrease the force with which the gathering drums 40 are urged toward each other.

Mounted on the rear end of the deck 8 is a power unit 53 which is connected by a belt drive 54 to a gear box 55. The gear box 55 is connected by suitable drive means 56 to the conventional power take-off of the tractor chasis 6, or otherwise suitably connected with the tractor units 1, so as to propel the machine.

The gear box 55 may also be connected through a hydraulic clutch 57 to a gear housing 58, which in turn is connected by shaft and universal joint drives 59 to a gear housing 60 mounted on a supporting plate 61 at the upper portions of the posts 9. The gear housing 60 is connected by shaft and universal joint drives 62 to the gear housings 38 of the gathering drums 40 and by another shaft and universal joint drive 63 and gear housing 64 to the drive gear 33 for the feed rotors 21.

Operation of the brush masticating machine is as follows:

The brush masticating machine is particularly useful in orchards. Trimmings from the trees are piled in windrows. The windrows comprise tangled masses of branches which are completely disoriented and may vary from small twigs to relatively large branches, and may vary from short lengths to long lengths.

The machine is driven down the windrows with the lower extremities and forward sides of the gathering drums 40 just clearing the ground. In fact, the lower or gathering and lifting vanes 42 may actually contact the ground as they move across the forward sides of the drums. The blades 42 gather the sides of the windrow and deflect the branches and leaves toward the center of the windrow and at the same time lift the windrow so as to guide the windrow between the gathering drums. The axial blades crush and break some of the branches and aid in compacting the windrow. The upper helical vanes 45 deflect the top of the windrow downward.

The crushed and partially compacted windrow passes between the gathering drums 40 and is guided thereby between the feed rotors 21 which are smaller in diameter. The spacing of the feed rotors is fixed so that all of the windrow must pass therebetween. The upper and lower plates of the feed rotors further compress the windrow so that its cross section is such as to pass readily through the mouth 24 of the masticating rotor 15. Once the windrow engages the masticating rotor, the branches and leaves are ground between the masticating rotor blades 17 and the anvils 20. The branches and leaves are integrated into chips or are pulverized and discharged from the opening 25 onto the ground. In order to control the operations, an operator may be stationed at one side of the deck 8 on a seat 65, and appropriate controls 66 may be arranged in front of the seat 65.

It will be observed that irrespective of the disorientation of the branches, both small and large, which comprise the windrow, the windrow is compressed laterally as well as vertically and then lifted in an upwardly and rearwardly directed path to the masticating unit 13. This is usually accomplished in a continuous operation. However, the tree trimmings may sometimes be massed in large piles, in which case the machine is driven into the pile, a qauntity of the tree trimmings is caught between the rotors, and the machine is backed off slightly until the captured branches are disintegrated, whereupon the machine is again driven forward and the process is repeated.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A machine for masticating brush and tree trimmings reposing in a tangled windrow along the ground, comprising: a tractor; a frame structure extending to the forward end of said tractor unit; means for raising and lowering said frame structue; a pair of arm stuctures pivotally connected to said frame structure about substantially parallel axes tilted rearwardly from the vertical; a pair of journaling structures carried at the forward extremities of said arm structures and likewise defining axes tilted rearwardly from the vertical; a pair of gathering drums carried by said journaling structures and rotatable about the axes thereof, said gathering drums extending downwardly therefrom and rotatable in opposite directions so that their confronting sides move rearwardly and upwardly, said gathering drums including helical gathering and elevating blades at their lower ends, the blades at the forward sides of said drums movable toward each other to pass rearwardly and upwardly between said drums, thereby to gather and elevate said windrow between said drums, and helical depressing blades at the upper ends of said drums; means rearwardly of said drums for compressing said windrow; and a masticating unit having a mouth to receive said windrow from said compressing means.

2. A machine for masticating brush and tree trimmings reposing in a tangled windrow along the ground, comprising: a pair of gathering drums, each including helical gathering and elevating blades at one end and helical depressing blades at its opposite end; means for journaling said drums about axes inclined from the vertical; means for rotating said drums in opposite directions; means for advancing said drums along said windrow in a direction whereby the elevating blades at the forward sides of said drums move toward each other, as well as upwardly and rearwardly between said drums to effect lateral crushing and elevation of said windrow, said depressing blades as they move between said drums tending to deflect the top of said windrow downwardly; a pair of rotors mounted rearwardly of said drums for rotation about parallel tilted axes, the confronting sides of said rotors arranged to turn rearwardly and upwardly from said drums to engage and feed said windrow upwardly and rearwardly therefrom, said rotors including lower helical blades pitched to deflect the underside of said windrow upwardly, and upper helical blades pitched to feed the top side of said windrow downwardly thereby to crush and compress said windrow; and a masticating unit including a housing structure defining a mouth for receiving said windrow from said rotors and a discharge opening, anvils carried by said housing, and a bladed rotor within said housing engageable with said anvils to masticate said windrow.

3. A machine for masticating brush and tree trimmings reposing in a tangled windrow along the ground, comprising: a tractor; a frame structure extending to the forward end of said tractor unit; means for raising and lowering said frame structure; a pair of arm structures pivotally connected to said frame structure about substantially parallel axes tilted rearwardly from the vertical; a pair of journaling structures carried at the forward extremities of said ram structures and likewise defining axes tilted rearwardly from the vertical; a pair of gathering drums carried by said journaling structures and rotatable about the axes thereof, said gathering drums extending downwardly therefrom and rotatable in opposite directions so that their confronting sides move rearwardly and upwardly, said gathering drums including helical gathering and elevating blades at their lower ends, the blades at the forward sides of said drums movable toward each other to pass rearwardly and upwardly between said drums, thereby to gather and elevate said windrow between said drums, and helical depressing blades at the upper ends of said drums; a pair of rotors mounted rearwardly of said drums for rotation about parallel tilted axes, the confronting sides of said rotors arranged to turn rearwardly and upwardly from said drums to engage and feed said windrow upwardly and rearwardly therefrom, said rotors including lower helical blades pitched to deflect the underside of said windrow upwardly, and upper helical blades pitched to feed the top side of said windrow downwardly thereby to crush and compress said windrow; and a masticating unit including a housing structure defining a mouth for receiving said windrow from said rotors and a discharge opening, anvils carried by said housing, and a bladed rotor within said housing engageable with said anvils to masticate said windrow.

4. A machine for masticating brush and tree trimmings reposing in a tangled windrow along the ground, comprising: a carriage arranged for travel along said windrow; a frame structure mounted on said carriage and including a pair of strut sets having rearward pivotal means and forward bearing means, said pivotal and bearing means defining axes disposed in parallelism and directed downward and rearward with respect to said carriage; a pair of shaft structures journaled by said bearing means and held in parallelism by said bearing means, said shaft structures having free end portions extending downwardly and rearwardly from said bearing means; drums mounted on the lower free end portions of said shafts, and also having free lower ends disposed for ground engagement, said drums being disposed by said shafts for rotation about downwardly and rearwardly directed parallel axes; yieldable means urging said drums toward each other; means for rotating said drums to cause their confronting sides to turn rearwardly relative to the carriage; helical elevating blades at the lower free end portions of said drums; other helical depressing blades at the upper end portions of said drums; said drums tending to squeeze said windrow laterally, said elevating blades tending to raise the ground side of the windrow, and the depressing blades tending to depress the top of the windrow, as the carriage advances along the windrow, thereby to compress the windrow into a dense mass as it discharges rearwardly between said drums; a masticator disposed behind said drums; and means for guiding and deflecting said mass of trimmings into said masticator.

5. A machine for masticating brush and tree trimmings reposing in a tangled mass on the ground, comprising: a pair of relatively large diametered tilted drums mounted for rotation about downwardly and rearwardly inclined parallel axes; intermeshing blades on said drums, said blades including axially extending portions at the central regions of said drums and oppositely pitched helical portions at the upper and lower regions of the drums, said upper helical portions tending to deflect the top of the mass of trimmings downwardly, said lower helical portions tending to scoop under the mass of trimmings and deflect the trimmings upwardly and rearwardly between said central regions of the drums, said drums by reason of their tilted positions adapted to discharge said mass of trimmings upwardly and rearwardly; a masticator disposed behind said drums; and means for guiding and deflecting said mass of trimmings into said masticator.

6. A machine for masticating brush and tree trimmings reposing in a tangled mass on the ground, comprising: a pair of relatively large diametered tilted drums mounted for rotation about downwardly and rearwardly inclined parallel axes; intermeshing blades on said drums, said blades including axially extending portions at the central regions of said drums and oppositely pitched helical portions at the upper and lower regions of the drums, said upper helical portions tending to deflect the top of the mass of trimmings downwardly, said lower helical portions tending to scoop under the mass of trimmings and deflect the trimmings upwardly and rearwardly between said central regions of the drums, said drums by reason of their tilted positions adapted to discharge said mass of trimmings upwardly and rearwardly; a supporting structure for said drums permitting lateral movement of said drums to and from each other; yieldable means urging the drums toward each other whereby said drums effect partial lateral compression of the mass of trimmings; a masticator disposed behind said drums; and means for guiding and deflecting said mass of trimmings into said masticator.

7. A machine for masticating brush and tree trimmings reposing in a tangled mass on the ground, comprising: a pair of relatively large diametered tilted drums mounted for rotation about downwardly and rearwardly inclined parallel axes; intermeshing blades on said drums, said blades including axially extending portions at the central regions of said drums and oppositely pitched helical portions at the upper and lower regions of the drums, said upper helical portions tending to deflect the top of the mass of trimmings downwardly, said lower helical portions tending to scoop under the mass of trimmings and deflect the trimmings upwardly and rearwardly between said central regions of the drums, said drums by reason of their tilted positions adapted to discharge said mass of trimmings upwardly and rearwardly; a pair of tilted rotors mounted rearwardly of said drums for rotation about downwardly and rearwardly directed axes substantially parallel to each other and to the axes of said drums; blades on said rotors including axially directed portions at the central region of said rotors and helical blade portions of opposite pitch at the end regions of said rotors, said rotors and their blades adapted to receive said mass of trimmings from said drums and effect further vertical and lateral compression thereof and discharge said compressed mass rearwardly and upwardly; a masticator behind said rotors; and means between said masticator and rotors for guiding and deflecting into said masticator the mass of trimmings issuing from between said rotors.

8. A machine for masticating brush and tree trimmings reposing in a tangled mass on the ground, comprising: a pair of relatively large diammetered tilted drums mounted for rotation about downwardly and rearwardly inclined parallel axes; intermeshing blades on said drums, said blades including axially extending portions at the central regions of said drums and oppositely pitched helical portions at the upper and lower regions of the drums, said upper helical portions tending to deflect the top of the mass of trimmings downwardly, said lower helical portions tending to scoop under the mass of trimmings and deflect the trimmings upwardly and rearwardly between said central regions of the drums, said drums by reason of their tilted positions adapted to discharge said mass of trimmings upwardly and rearwardly; a pair of tilted rotors mounted rearwardly of said drums for rotation about downwardly and rearwadly directed axes substantially parallel to each other and to the axes of said drums; blades on said rotors including axially directed portions at the central region of said rotors and helical blade portions of opposite pitch at the end regions of said rotors, said rotors and their blades adapted to receive said mass of trimmings from said drums and effect further vertical and lateral compression thereof and discharge said compressed mass rearwardly and upwardly; a masticator including frusto-conical rotor elements disposed with their smaller ends contiguous, rotating cutter blades carried by said rotor elements, and fixed cutter blades disposed for coaction with said rotating cutter blades; and a housing enclosing said rotor and shaped at the forward side of said rotor elements to form an entrance mouth, said rotors being disposed at laterally opposite sides of said mouth, the central regions of said rotors and central portion of said blades being reduced in diameter and curved in conformity with said rotor elements.

9. A machine for masticating brush and tree trimmings reposing in a tangled windrow along the ground, comprising: a pair of gathering drums, each including helical gathering and elevating blades at one end and helical depressing blades at its opposite end; retractable fingers at the leading edges of said gathering and elevating blades; means for journaling said drums about axes inclined from the vertical; means for rotating said drums in opposite directions; means for advancing said drums along said windrow in a direction whereby the elevating blades at the forward sides of said drums move toward each other, as well as upwardly and rearwardly between said drums to effect lateral crushing and elevation of said windrow, said depressing blades as they move between said drums tending to deflect the top of said windrow downwardly; means rearwardly of said drums for compressing said windrow; and a masticating unit having a mouth to receive said windrow from said compressing means.

10. A machine for masticating brush and tree trimmings reposing in a tangled mass on the ground, comprising: a pair of relatively large diametered tilted drums mounted for rotation about downwardly and rearwardly inclined parallel axes; intermeshing blades on said drums, said blades including axially extending portions at the central regions of said drums and oppositely pitched helical portions at the upper and lower regions of the drums; retractable fingers at the leading edges of said lower helical blade portions; said upper helical portions tending to deflect the top of the mass of trimmings downwardly, said lower helical portions and said retractable fingers tending to scoop under the mass of trimmings and deflect the trimmings upwardly and rearwardly between said central regions of the drums, said drums by reason of their tilted positions adapted to discharge said mass of trimmings upwardly and rearwardly; a masticator disposed behind said drums; and means for guiding and deflecting said mass of trimmings into said masticator.

References Cited in the file of this patent

UNITED STATES PATENTS

| 2,426,922 | Carroll | Sept. 2, 1947 |
| 2,657,513 | Martin | Nov. 3, 1953 |
| 2,663,985 | Hinson | Dec. 29, 1953 |